United States Patent

[11] 3,609,695

[72] Inventor Sherman J. Pirkle
Framingham, Mass.

[21] Appl. No. 728,274
[22] Filed May 10, 1968
[45] Patented Sept. 28, 1971
[73] Assignee Honeywell Inc.
Minneapolis, Minn.

[54] DISPLAY-ENTRY DATA TERMINAL
6 Claims, 16 Drawing Figs.

[52] U.S. Cl. .......... 340/172.5, 340/173 R
[51] Int. Cl. .......... G06f 3/14
[50] Field of Search .......... 340/172.5, 173; 350/150, 160

[56] References Cited

UNITED STATES PATENTS

| | | | |
|---|---|---|---|
| 3,165,634 | 1/1965 | Raymond .......... | 340/173 X |
| 3,191,006 | 6/1965 | Avakian .......... | 340/172.5 X |
| 3,307,156 | 2/1967 | Durr .......... | 340/172.5 |
| 3,399,401 | 8/1968 | Ellis et al. .......... | 340/172.5 X |
| 3,440,620 | 4/1969 | French .......... | 340/173 |
| 3,337,860 | 8/1967 | O'Hara, Jr. .......... | 340/172.5 |

*Primary Examiner*—Raulfe B. Zache
*Assistant Examiner*—Mark Edward Nusbaum
*Attorneys*—Fred Jacob and Robert J. Zinn

ABSTRACT: A data display-entry terminal for a data processing system wherein a selected image is projected onto a viewing screen which is enclosed by two orthogonal banks of light beam-photodetector units, each unit comprising a set of source-detector combinations spaced apart in registry and arranged to project an associated array of parallel beams, the intersection of orthogonal beams defining respective index points on the screen such that interjection of a selection probe etc. at an index point may interrupt a pair of such coordinate beams. This coincident beam interruption may be adapted to generate positional select signals to be entered in an associated data storage means, at a memory cell therein corresponding to the selected point and to the selected portion of the associated image on the screen. The memory matrix is organized to control an associated array of optical feedback signals projected onto this screen for verifying each selection and, at the operator's option, to transmit an encoded pulse train indicating the image portion selection to an associated data processing system.

PATENTED SEP 28 1971

3,609,695

SHEET 1 OF 8

INVENTOR.

BY Sherman J. Pickle

John J. McCormack

ATTORNEY

INVENTOR.

BY Sherman J. Perkle
John J. McCormack
ATTORNEY

INVENTOR.

BY

ATTORNEY

INVENTOR.
BY Sherman J. Pickle
John J. McCormack
ATTORNEY

INVENTOR.
BY Sherman J. Pikk[illegible]
John J. McCormack
ATTORNEY

INVENTOR.

BY Sherman J. Pickles

John J. McCormack
ATTORNEY

INVENTOR.

BY Sherman J. Pukle

John J. McCormack

ATTORNEY

INVENTOR.

BY Sherman J. Pikl[signature]

John J. McCormack[signature]

ATTORNEY

DISPLAY-ENTRY DATA TERMINAL

BACKGROUND, INVENTION FEATURES

The present invention relates in general to a data display, data-entry and storage device for use with an associated data processing system; and, in particular, to an image-display/data selection terminal providing novel features of data storage, data verification-display, and data readout Heretofore, it has been feasible to contemplate various types of data display/entry devices for use with data processing systems. In one such device, a cathode ray tube may be used for visually displaying data images, in conjunction with a photocell probe manipulated by an operator to generate an indication of the selection of desired portions of an image. Another such device involves an image projector, together with an associated viewing screen having a matrix of coordinate-conductors associated therewith and a stylus adapted to couple electrical energy to a selected intersecting pair of these coordinate conductors to thereby signal a corresponding image selection. Such display-selection devices are complex and expensive to construct. For instance, they require elaborate display media and selection probe apparatus. They also require complex data sequencing and control circuits for storing the digital signals indicating image selection and for transferring the stored digital data to an associated data processing system. Further, they make it necessary to provide an optical feedback marker indicating image selection. The invention provides an improvement over these.

SUMMARY OF THE INVENTION

In a preferred embodiment the invention comprises a data entry terminal including a viewing screen enclosed by two orthogonal banks of light beam-photodetector units arranged so as to define a plurality of data selection index points at their beam intersections and generate input select signals representative thereof; a matrix of storage cells comprising a number of silicon control rectifier switches, each corresponding to a respective index point and adapted to register the associated input signal, also being adapted to control the energization of an associated indicator lamp arranged to project an optical feedback signal to verify this registration for corresponding index point on the viewing screen. The data entry terminal further includes a sequencing system which, besides performing the usual function of "time-interrogating" the storage cells, also operates, first, to encode the input signals; second, to decode the select signal in the storage matrix; third, to encode the readout signal from the storage matrix; and fourth, to periodically provide energization pulses, of prescribed duration, for driving the feedback lamps.

THE DRAWINGS

FIG. 3 is a logic subdiagram of the storage matrix, strobe driver and Y-strobe generator portions of the embodiment in FIG. 3, more detailed;

Figure 3:
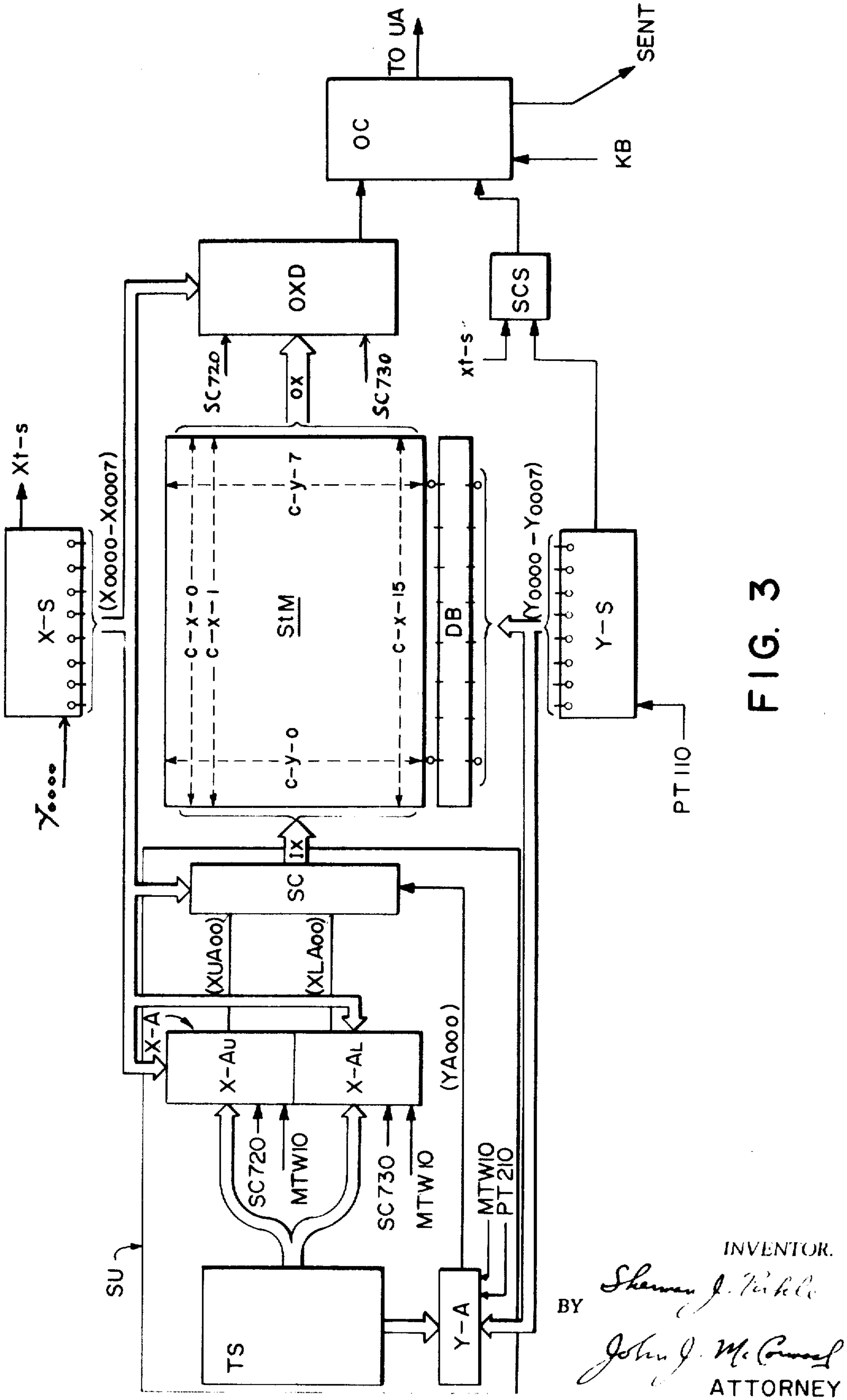
FIG. 3 is a logic diagram of the embodiment in FIG. 2.
Figure 3:
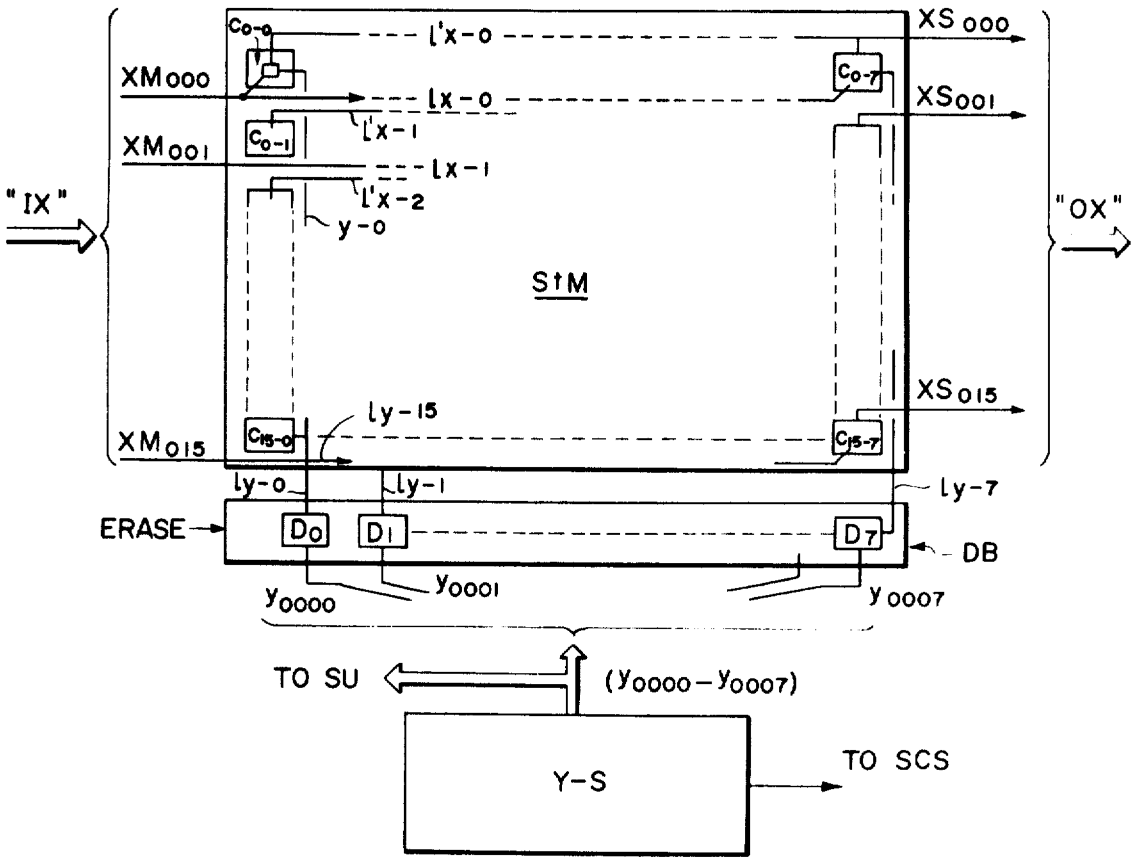
Figure 3A:
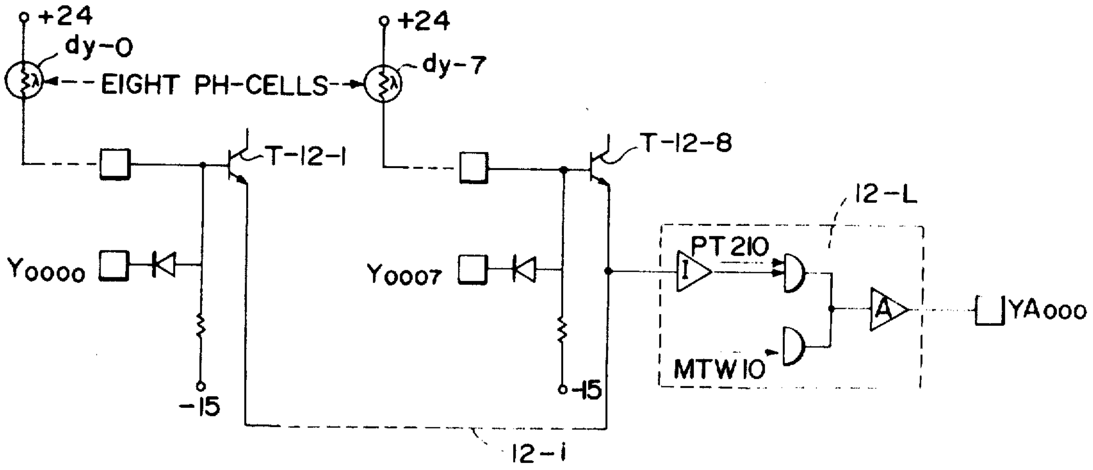
Figure 3B:
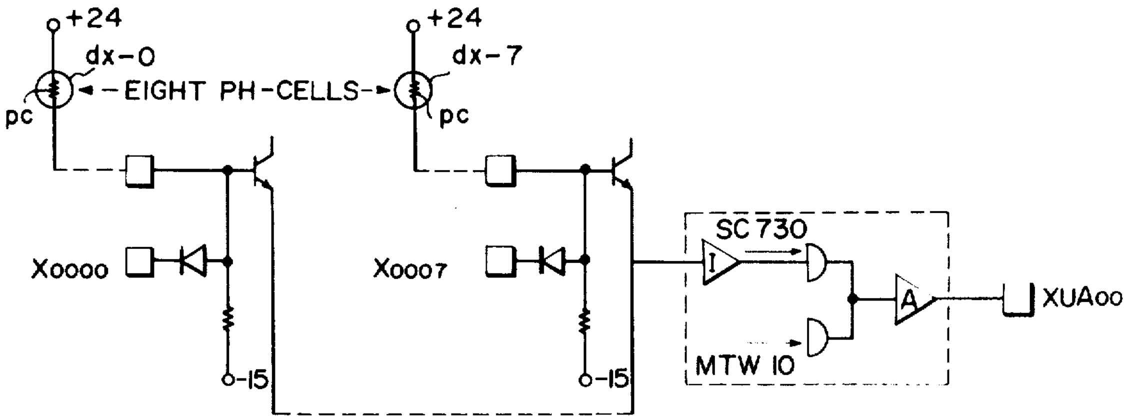
Figure 3C:
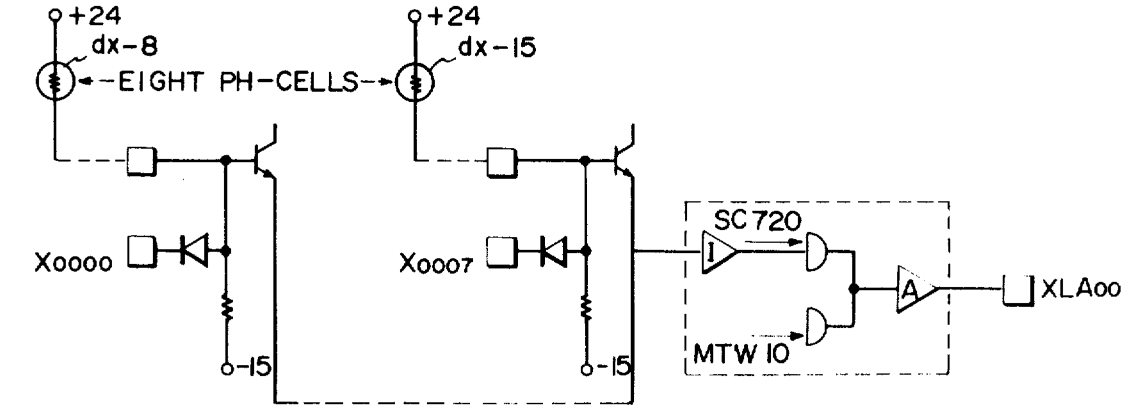
Figure 4:
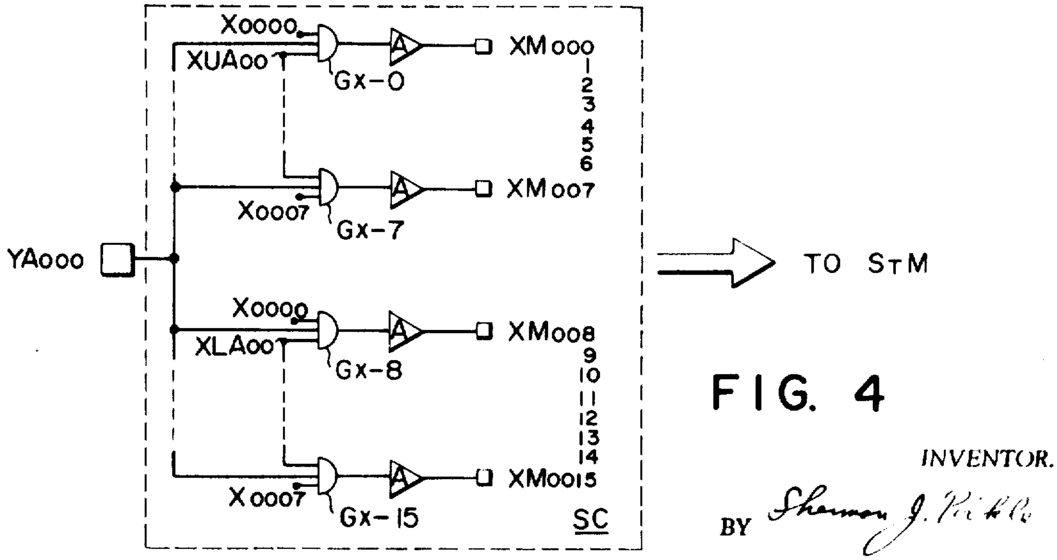
Figure 5:
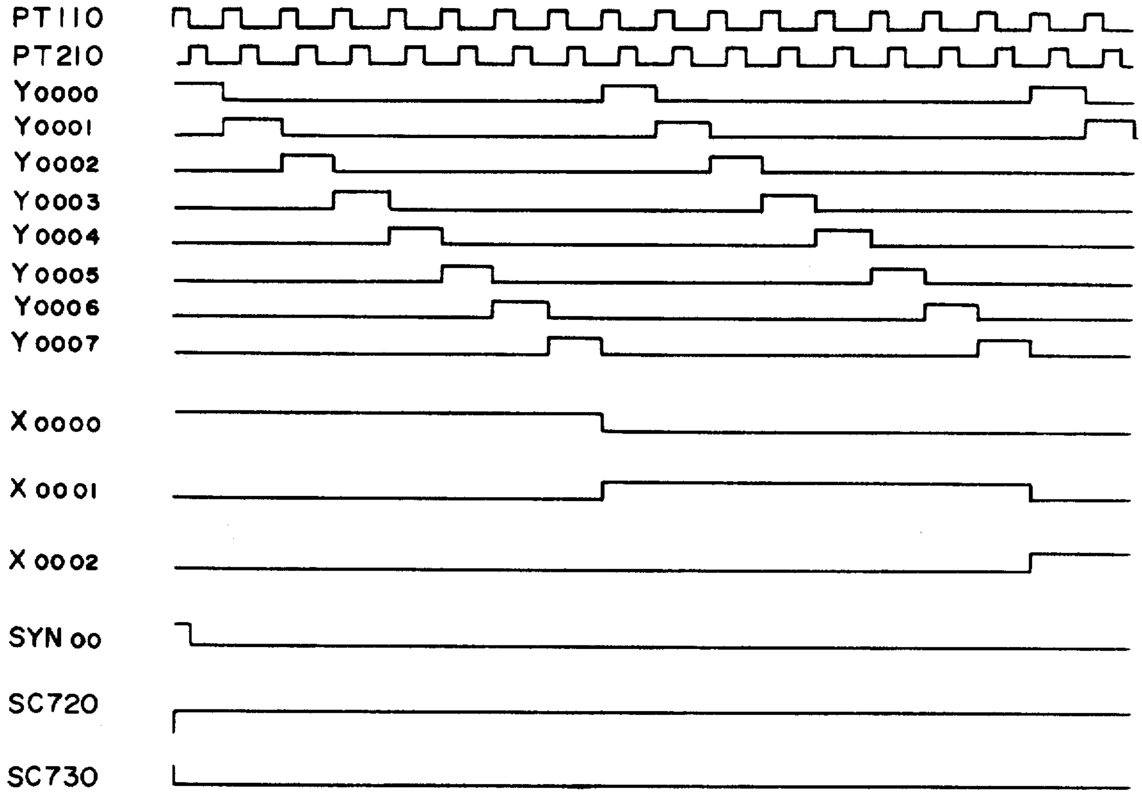
Figure 6:
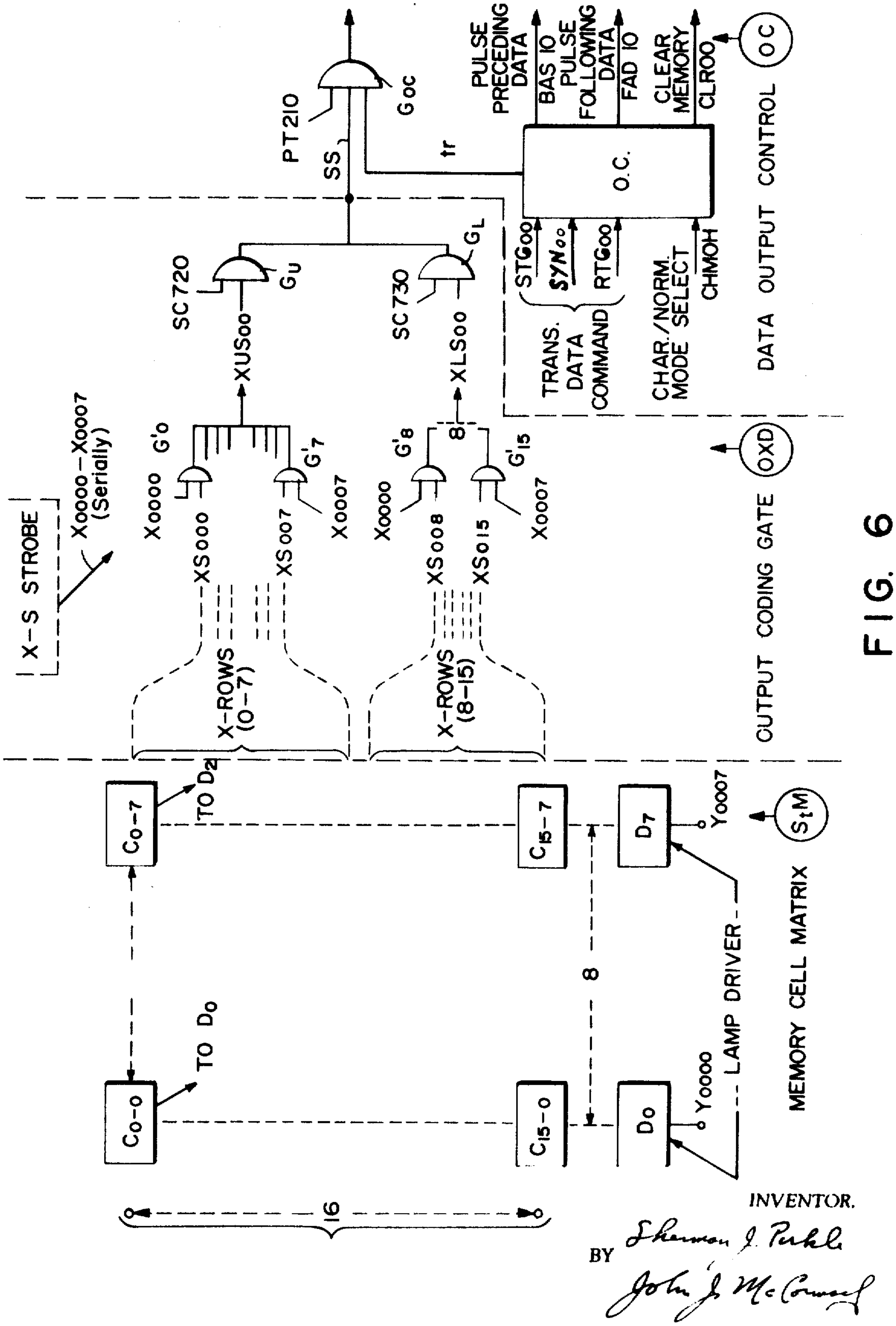

FIGS. 3A and 3B/3C are schematic diagrams, part circuit and part logic, of representative arrangements of, respectively, the "Y" and the "X" photocell-amplifier circuits in this embodiment;

FIG. 4 is a logic diagram of a memory driver circuit adapted to receive the outputs of the aforementioned photocell amplifier circuits (in FIGS. 3A, 3B and 3C) and to logically encode them for application to the memory storage matrix;

FIG. 5 is a logic timing diagram for indicating and explaining typical operation of the active elements in this display-selection terminal embodiment;

FIG. 6 is a logic diagram of the functional relationship of representative units in the memory stage STM in logical relation to output means such as the data gate OXD and the output control unit OC.

Figure 11:
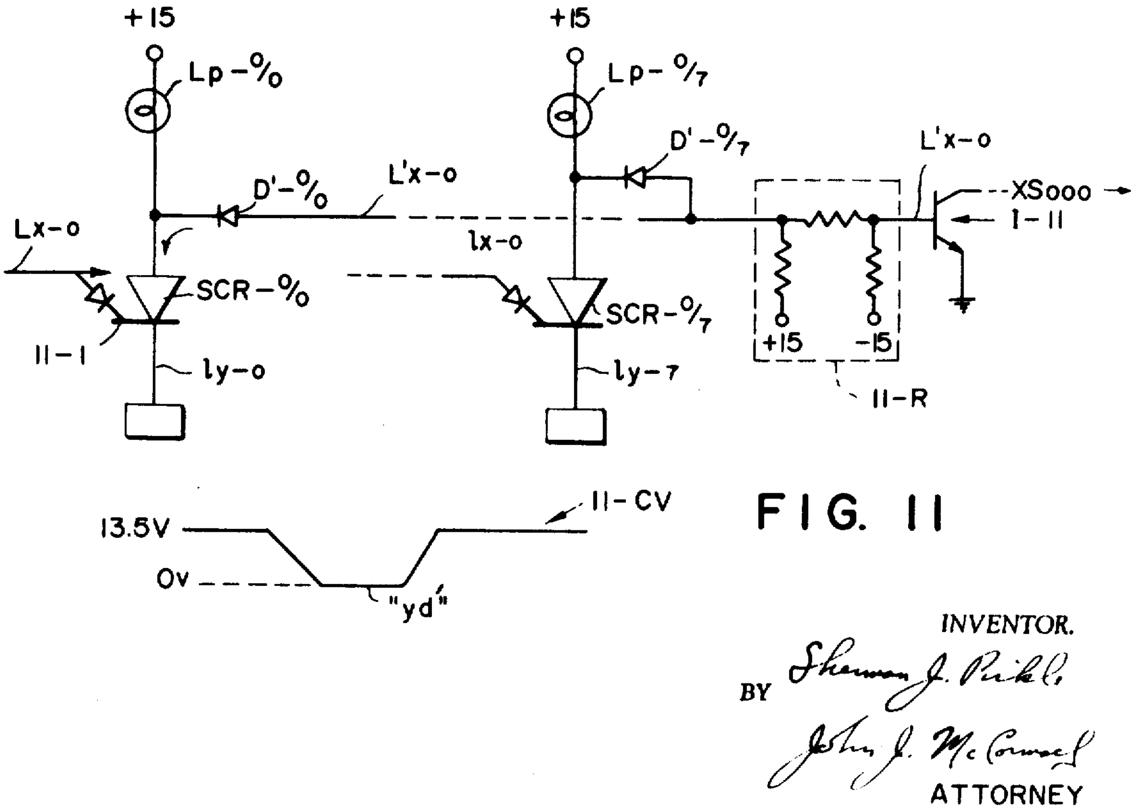
Figure 7:
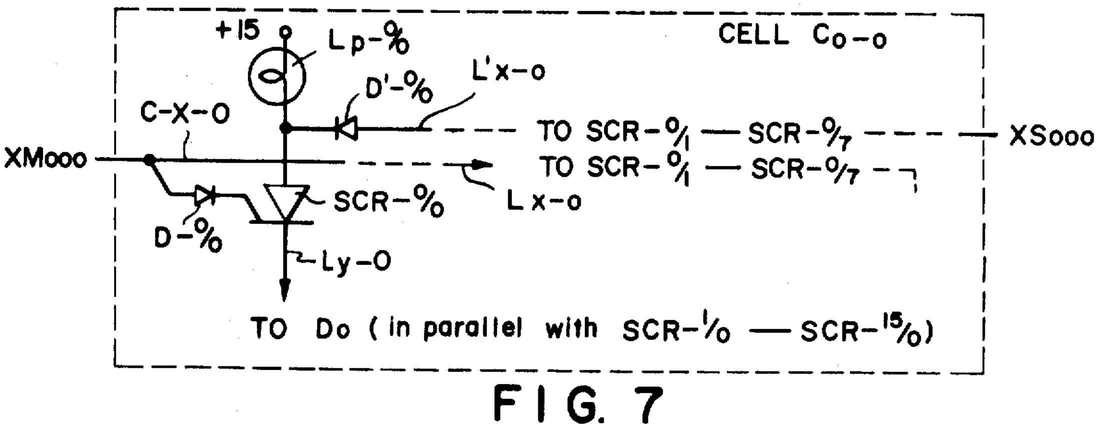
Figure 8:
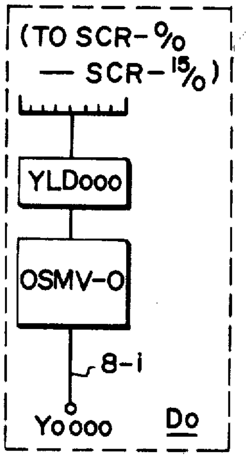
Figure 9:
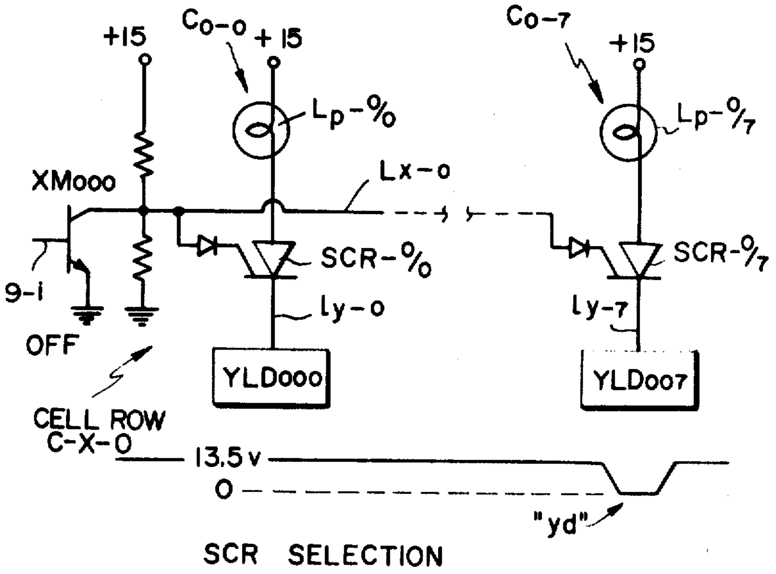
Figure 10:
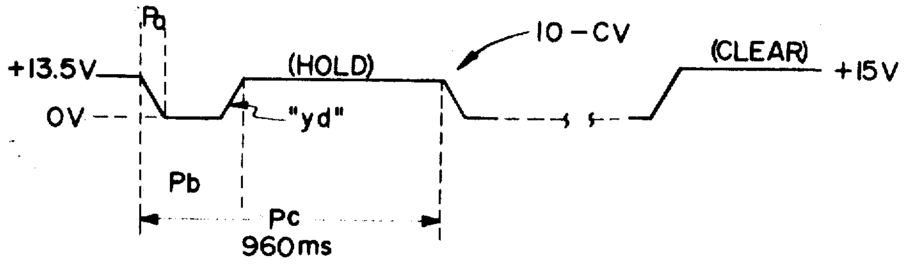

FIG. 7 is a schematic circuit showing of a representative storage cell in the storage matrix suitable for indicating preferred elements therein and representative operation thereof;

FIG. 8 shows the logical organization of a representative Y-column driver unit;

FIG. 9 is a fragmentary schematic circuit diagram of the active elements along an exemplary X-row of the storage matrix;

FIG. 10 is a representative operational curve of the typical active states of a switch element;

FIG. 11 is a schematic circuit showing one row of storage cell circuits, representationally, suitable for indicating the digital readout operation of a selected storage cell.

FUNCTIONAL ENVIRONMENT

It will be apparent to those skilled in the art that the sequencing system according to the invention has particular advantage in conjunction with display data entry terminals such as may be aptly used as for data-input in a data processing system (e.g. for projecting image information and allowing selection of image portion with automatic entry thereof). Thus, a particular "tactile terminal" embodiment of the invention will be described below as associated with, and controlling, such a terminal. The broad hardware outlines and operation of this will be described in connection with the FIG. 2, while the display panel will be described with reference to FIGS. 1 and 1A. The electronic selection, storage and control elements are generally described with reference to FIG. 3 (showing their logical arrangement), and more particularly described with reference to the remaining FIGURES.

PANEL

Figure 2:
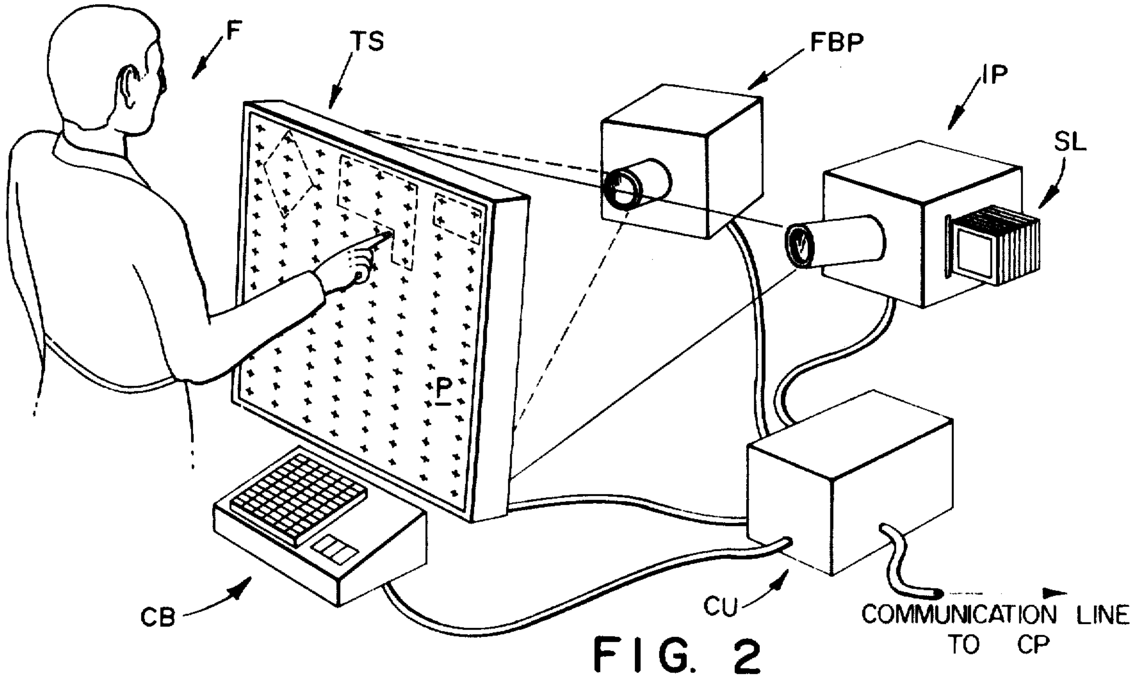
FIG. 2 is a very functional perspective view of the panel of FIG. 1A together with the other functional units of this embodiment.

Turning now to FIG. 2, the broad organization and operational objectives of this embodiment will be seen as including a select-display unit TS including a display panel (or screen) P, an image projection unit IP, one possible projection unit would be a Kodak Carousel Slide Projector, Model 700, an associated control unit CU, a feedback projector unit FBP, whose circuitry is shown in FIG. 9, except for the optical portion which may be as set forth in French Pat. Ser. No. (3,440,620), and a keyboard unit CB one possible keyboard unit is shown in Durr Pat. Ser. No. (3,307,156). Projector IP is arranged to selectively project "selectable" ones of a battery of slides SL onto panel P. It will become apparent that an operator F can view the images projected onto P for purposes of selecting an image portion (or portions) so that the control unit CU of the terminal will respectively automatically, record the selection and effect "data entry" (e.g. communicate with a computer CP, as described below, etc.).

Figure 1:
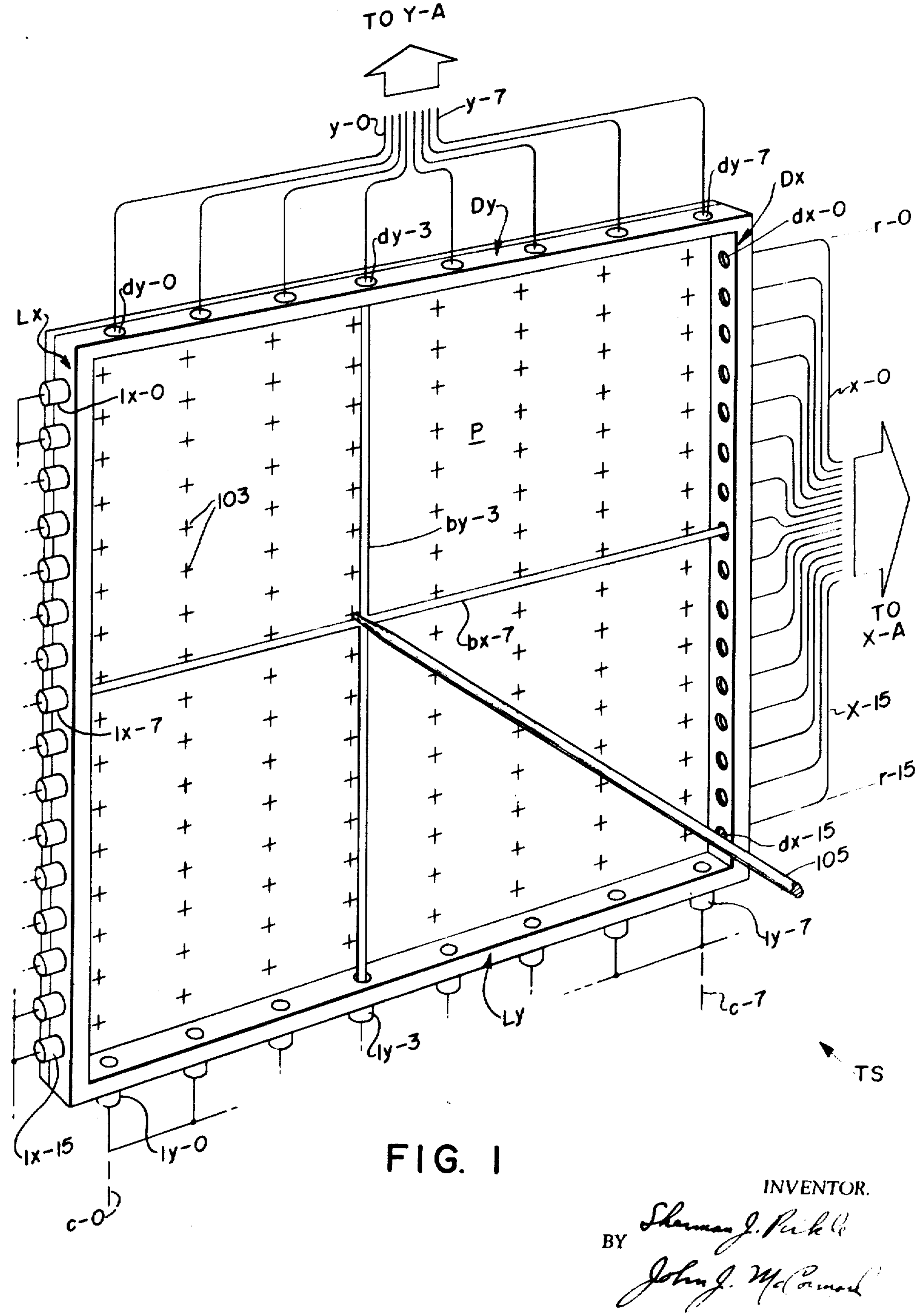
FIG. 1 is a front perspective view of a display-selection panel portion of a data entry terminal embodiment of the present invention.
Figure 1A:
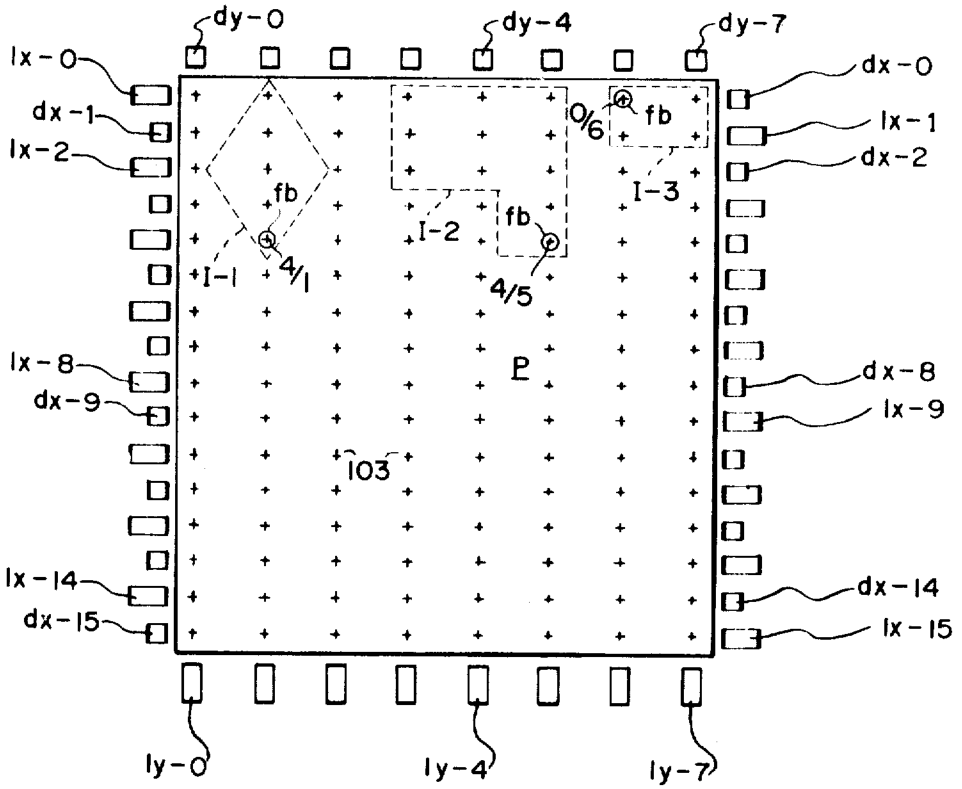
FIG. 1A is a schematic plan view of panel like that of FIG. 1, slightly modified and positioned illustrative representative image patterns.

As seen more particularly in connection with FIGS. 1 and 1A, the panel P comprises a matrix of "index (selection) points" (or loci) 103 which are each defined by the intersection of two respective light beams. The contemporaneous interruption of such a pair of intersecting light beams (at such an index point) is controlled and encoded to automatically indicate what portion of the panel (i.e. what image portion thereon) is "selected." Thus, the interposition of a selection probe (e.g. an operator's finger, or a probe 105 in FIG. 1) to interrupt such beam pairs will be seen to initiate data entry with great convenience and simplicity. The keyboard (control panel) CB will be seen as enabling the operator to control image projector IP (via control unit CU) such as for initiating, sending and receiving messages, for recording commands and the like. Feedback projector unit FBP will be understood as adapted to indicate optically (or otherwise), on panel P, that the system has experienced and registered a particular "selection"; projecting a "highlight" (e.g. a spotlight fb, or other optical marker signal) at the "selected" index point for operator verification feedback, as known in the art.

As seen below, it is a feature of this embodiment that a simple panel/photodetector/control arrangement can automatically provide signals for controlling the generation and handling of such image/selection data and for also controlling indicator elements, such as those providing a verify-display as aforementioned. As a related feature, it will be seen that such a unit may include timing means for sequencing read-in of such select signals to the data storage matrix, this timing means also being able to sequence readout therefrom. The timing means may be readily adapted to also control feedback-verify indications.

Turning to the particulars of FIGS. 1 and 1A here, select-display panel P is illustrated in some detail to define an arbitrary array of index points 103, the number and the arrangement thereof being widely variable, of course. Points 103 are each defined by the intersection of a respective pair of crossed light beams, such as representative beams *bx*–7, *by*–3 (generated between respective lamp-detector sets *lx*–7/*dx*–7, *ly*–3/*Y*–3); defining index point 7/3. In this embodiment, it will be seen that such light beams emanate from a bank of lamps *lx* comprising an aligned equally spaced set of lamps L*x*, G *e* (*lx*–0 through *lx*–15) arranged to divert collimated beams along 16 panel rows *r*–0 through *r*–15. In opposed registry with lamps L*x*, on the opposite side of panel P, is a bank of detect units D*x* comprising a set of 16 photodetectors *dx*–0 through *dx*–15, registering with the lamps *lx*–0 through *lx*–15, respectively. The output from each of these detectors is led along conductors *x*–0, lines *x*–0 through *x*–15 to a strobe-controlled gating stage X–A (see FIG. 3) so that a pulse may be presented to indicate the interruption of an associated "*x*-light beam," such as by probe 105 along rows *r*–7, *c*–3 (at index point 7/3). In a similar fashion an array of "Y" light beams is arranged to intersect the X-beams (between lamp-detector banks LX/DX) in matrix-defining fashion, along eight equispaced columns *c*–0 through *c*–7. These eight light beams are generated by a bank of eight lamps L*y* (i.e. *ly*–0, *ly*–1 etc.) arranged along respective columns to register with respective detectors in an associated bank of detectors D*y* (detectors *dy*–0 to *dy*–7), as with the aforedescribed LX/DX array. Detectors *dy*–0 through *dy*–7 are arranged to present their outputs, respectively, along associated conductors *y*–0 through *y* –7 to be presented to an associated "y-gating" stage Y–A (FIG. 3). The lamps in the aforedescribed units may be arranged, as known in the art, so that they direct a collimated beam (i.e. a relatively parallel bundle of light rays), along their respective axis to activate their associated photodetectors with little or no beam-spreading or stray light therefrom. The associated detectors may be inset and registered so as to be uniquely energized only by their associated lamp sources and to be substantially nonresponsive to stray, ambient light or the like.

Panel P is also indicated in plan view in FIG. 1A (detectors *dy*–0, together with a similar, "8 × 16" array of lamp-detectors (*dy*–0 through *dy*–7 and *dx*–0 through *dx*–15). However, according to an improved feature of the invention, certain adjacent detectors and lamps here are "staggered," in alternating fashion, from one side of panel P to the other. This will be understood as allowing closer "compaction" of the detection axes (providing a high density of index points); while yet allowing for a slight divergence of the lamp beams. Such a "staggering" is indicated, here, only for the "X-detector array" (cells *dx*–0 to *dx*–15, with associated respective lamps *lx*–0 through *lx*–15 "interleaved"). A set of images I–1, I–2, I–3 is also shown in FIG. 1A as projected onto panel P, primarily for purposes of explanation. It should be understood that any array of images may be projected onto panel P such that a portion thereof may be selected by the introduction of a probe (beam-interrupting) means at a corresponding index point so as to interrupt the two corresponding light beams there. Panel P will be understood by those skilled in the art as comprising any relatively transparent projecting screen which is closely adjacent the plane of light beams bx, by, the latter being understood as coplanar in a prescribed select plane. Thus, both the selectable images and the feedback signals *fb* may be projected onto panel P to appear relatively along this select plane. As indicated in FIG. 1A, the index points 103 may be identified in terms of their column/row designation so that for instance index point 4/1 defines the intersection of row *r*–4 *and column c*–1 (and similarly for illustrated index points 4/5 and 0/6 etc.). By way of explanation, it will be understood that these index points in FIG. 1A have already been selected by an operator and processed by the control unit CU which has automatically caused the feedback projector FBP to generate a series of associated spotlighting indications "*fb*" which are understood as indicating to the operator that the machine has recorded these three selections (at points 4/1, 4/5, 0/6). Those skilled in the art will recognize that such a matrix of light beams may be otherwise produced; such as by replacing lamps *lx*, *ly*, each by a common lamp source, together with a collimating mask means creating a beam-hole for each row and column. Alternatively, a single source and an array of properly oriented light fibers (or the like) may be used for both lamp banks. The feedback "spots" may likewise be alternatively supplied to panel P.

PANEL SELECT LOGIC

Turning now to FIG. 3, a schematic logical arrangement is indicated for controlling the terminal, such as for accepting "*x*, *y* select signals" from selection unit TS, controlling the processing and storage thereof, and providing readout therefrom at a selectable time, as well as for generating the associated feedback indication *fb*. Thus, select unit TS is indicated as part of an overall select stage SU which also includes X-gate unit (X–A), Y-gate unit (Y–A) and select control unit (SC). Unit X–A is adapted to accept the sixteen "D*x*-photodetect" outputs and amplify and present them to select control unit SC, under the control of an X-strobe unit X–S, as particularized below. Y-gate unit Y–A will be seen as adapted to accept the eight "Dy-photodetect" signals (from the Y detectors *dy*–0 through *dy*–7) and present them to control unit SC, under the time control of a Y-strobe stage Y–S. As indicated in more detail below (especially in connection with FIGS. 3' and 5), this "Y-strobe" unit Y–S will be understood as essentially comprising a multistage binary counter, the stages being stepped by prescribed clock pulses PT–110, with the outputs gate-enabled conventionally, so as to issue, at prescribed equal time intervals and cyclically, a set of eight successive "Y-strobe" signals Y0000 through Y0007. These Y-strobe signals are to be applied to gate unit Y–A (to eight associated gate inputs thereof) as well as to an (interrogate) driver stage db. (eight drive inputs thereof). In a similar fashion, the "X-strobe" unit X–S will be initiated (by Y0000 pulse from Y–S) to generate eight "X-strobe" pulses X000 through X0007 and apply them to X-gate unit X–A (in parallel to the upper and lower sections thereof) for "time-serializing" outputs therefrom, as well as to control unit SC, where they are "time-decoded" and gated to a respective one of 16 storage cell arrays (along storage cell rows *c*–*x*–*0* to *c*–*x*–15 in Memory Stage $S_TM$; see FIG. 3' also).

As will be particularized below, the select unit SU may thereby be adapted to emit from control unit SC a set ("IX") of 16 parallel pulse trains to $S_TM$. (Note: the particulars of control unit SC are shown in FIG. 4; while those of unit X–A and unit Y–A appear in FIGS. 3B, 3C and FIG. 3A, respectively). The 16 "*x*, *y* select signal" pulse trains (eight pulses in each, at eight "Y-strobe" times, indicated as XM000 through XM015) are amplified and presented in parallel to corresponding input lines *lx*–0 through *lx*–15 of Memory $S_TM$ (coupled to cell rows *c*–*x*–0 through *c*–*x*–15 respectively). As more particularly described hereinafter, Memory matrix $S_TM$ comprises a "16 by 8" matrix of *x*, *y* storage cells (one cell corresponding to each of the 128 index points 103 on Panel P), i.e. cells $C_{0-0}$ through $C_{15-7}$, arranged in eight "*y*-columns" (*c*–yaq0 through *c*–*y*–7); and 15 "*x-rows*" (*c*–*x*–0 through *c*–*x*–16). Thus, referring to FIG. 3' also, one cell (or storage circuit C) will be seen as provided to indicate selection of a corresponding index point on panel P. For example, cell $C_{0-0}$ will "record" (register) the selection of index point 0/0; cell $C_{15-7}$ will record selection of index point 15/7, and so forth.

As particularized in FIG. 3' and elsewhere, an *x*, *y* selection signal along any of the sixteen "IX" input lines (line 1*x*–0 for signal XM000, etc.) will be applied to a particular associated "*x*-row" of cells (e.g. line 1*x*–0 for cells in row *c*–*x*–0) and will have a particular "time sense." That is, to register a stored "-hit" at one of the cells in that *x*-row (indicating selection or "-pick," of a corresponding index-point in TS), the signal pulse must be contemporaneous with the application of a strobe pulse from driver DB along the particular *y*-column in $S_TM$ (e.g. *c*–*y*–1) corresponding to the column selected (e.g. *c*–1) on panel P. Thus, the strobe control unit Y–S (the "Y-sequencer") will be seen to perform the functions of time-encoding (serializing) the Y-detect signals (at gating unit Y–A for generation by control unit SC to be applied along memory rows *c*–*x*–0 through *c*– *x*–15), as well as decoding them in $S_TM$ for selection of a particular associated storage cell C, according to the coincidence of the input pulse "IX" with the application of the cyclically applied strobe pulses from strobe unit DB (under control of Y–S). Among other advantages, those skilled in the art will appreciate that this greatly simplifies the wiring problems between detectors associated with select unit TS and the storage cells in Memory Stage $S_TM$.

According to another feature of this invention, strobe control unit Y–S may also be used to cyclically apply energizing pulses to indicator means (e.g. lamps L*p*) associated with each of the 128 cells C in memory matrix $S_TM$. These indicator lamps will be seen as gated to be energized with a "hit" registered in their associated memory circuit C, with unit Y–S applying energizing pulses periodically to successive columns of lamps and causing them to be energized "serially by column." If the thermal time constant of the lamps is sufficiently large (duration of illumination apparent to operator), a "scanning" indicator voltage so-applied may be used here, rather than a steady-state voltage. One advantage to the latter is that an overvoltage (overwattage) may be periodically applied to the lamp whereupon it will glow satisfactorily without burning out—eliminating the need for any other gating means and any other power switch, i.e. a "sharing" of lamp-power with pulsing of lamp-strings in a strobelike manner. As a further improvement, a solid state switch (e.g. a silicon controlled rectifier SCR) may be used for memory storage and also to gate this periodic lamp-pulsing only when enabled ("-switched-on"), being sufficiently energized between lamp-pulses to "hold-on" in a bistable manner until "memory clear" time is commanded (by operator). According to a further feature of the invention, particularized below, strobe Y–S is also adapted to be used for controlling readout from matrix $S_TM$ so as to be serialized (time-encoded, as at gate Y–A).

"Read-out" is accomplished somewhat analogously to "read-in," in that 16 output pulse-trains "OX" (each having 8 bits, time-encoded by Y–S) are applied in parallel along 16 output lines (L'*x*–0 through L'*x*–15) to output encoder unit OXD, to be "serialized" under the control of "X-strobe" unit X–S (in synchronism with signals X0000–X0007) and then applied to output control unit OC, being thereafter selectively applied to a utilization terminal UA (e.g. under the control of a keyboard signal KB and/or a starting signal from a start control unit SCS). Transmission to UA may be indicated by a "-sent" signal, as known in the art. Output decoder OXD, output control unit OC and their associated devices and operations are more particularly described below in connection with FIG. 6.

SELECTION

The generation and processing of selection signals, indicating selection (beam-interruption) at a particular index point 103 on selection-display panel P has been generally and functionally described above. This will now be particularized for the present embodiment, referring to the control logic in FIG. 3 and the particular detect circuit arrangements in FIGS. 3A, 3B and 3C. The particulars of the storage matrix $S_TM$, indicated in FIGS. 3' and 7, 8 and 9, will thereafter be treated. FIG. 3A will be understood as indicating schematically, and only representationally, the circuit organization of the eight Y-photodetectors (photoresistors *pc*, identified fragmentarily as detectors *dy*–0, *dy*–7—only these being shown). Each detector *pc* is connected to a source of voltage (+24) and has the output thereof coupled to the base of an associated transistor gate (e.g. T–12–1 for *dy*–0), being applied thereto in conjunction with the appropriate "Y-strobe" input (e.g. Y0000 for *dy*–0) from unit Y–S (this input being diode-coupled thereto), and also in conjunction with a source of potential (−15). Thus, it will be understood by those skilled in the art that if none of the panel beams have been interrupted, all the photocells *pc* will remain in their "off" (low resistance) state to thereby couple a more positive voltage to the TR base and normally allow T–12 to "follow" strobe pulses Y0000 etc., i.e. to generate, responsively, a positive-going output pulse on conductor 12–*i*, given application of Y-strobe pulses as well. Conversely, when selection is made at a detector (associated beam interrupted), it will go "ON" (high resistance state) tending to drive the transistor base negative so that, despite the concurrence of the Y-strobe pulse, TR will not "conduct" and thus no output pulse will appear on 12–*i* at this "Y0000 time." This out-anomaly, or absence of an input to inverter I will be detected (and inverted) as a drop in what would normally appear as a relatively continuous chain of output pulse along 12– *i* (since the eight Y-strobe pulses are relatively continuous). This will provide a "time-encoded" select-pulse (indicating the associated "*y*-column" selection) at an associated output gating stage 12–L, the latter being common to all eight detectors *dy*. After inversion at I, this will act to apply a positive-going pulse to enable the gate in the associated select gate stage 12–L to generate select logic pulse YA000 (for application to control unit SC, FIG. 3). Select gate 12–L will thus be understood to include suitable conventional gating and amplifying means, as understood in the art, so as to be capable of providing eight distinct time-encoded select-logic signals "YA000," the time-occurrence of each indicating which "*y*-column" was selected.

In a similar manner, sixteen "*x* photoconductors" are shown in FIGS. 3B, 3C as arranged to comprise the "*x*-detectors" (*dx*–0 through *dx*–15; here divided for convenience of logical handling here into two, upper and lower, detection stages X–AU, X–AL, with eight detectors each). In the aforedescribed manner of FIG. 3–A, these "X-detectors" function to record selection (beam interruption) along a respective *x*-row of panel P (and time-encode it, for efficiency of signal transmission to control unit SC), these to be decoded. In this fashion, a pair of (time-encoded) upper and lower "X-select" pulses (XUA00, XLA00, respectively), may be provided (see FIG. 4) indicating that selection of the first or second group of eight X-detectors was made (the time-sense indicating which of the eight rows therein). These signals are coupled in logical fashion and in parallel, to a respective eight X-detection gates G*x*–0 through G*x*–15 in unit SC, in conjunction with the aforeindicated "Y-detect" signal YA000, and together with a corresponding (time-decoding) strobe output from X-strobe X–S (e.g. output X0000 for G*x*–0, etc.). The outputs from each of these gates may be amplified and coupled in parallel to a respective one of the sixteen *x*–input conductors L*x* in Memory Matrix $S_TM$ (e.g. output XM000 from gate G*x*–0 to *x*-input line L*x*–0). Thus, as a feature of the teaching, select signals will be seen as efficiently generated by detection of intersecting beam interruption coincidentally and applied to Memory.

The structure, characteristics and operation of the aforementioned strobe unit Y–S will now be described in connection with FIGS. 3, 3' and 5. The resultant control exercised by Y–S on select unit SU and memory $S_TM$ will best be understood by a consideration of its operational characteristics as indicated in the representative timing diagram of FIG. 5. Here, a reference train of regular clock pulses PT110 will be understood as conventionally generated and applied to unit Y–S, being conventionally generated (such as by a shift register, etc. or the central processor of a computer) to exhibit a prescribed constant frequency (e.g. period here about 120 ms.) and duration (e.g. here about 30 microseconds). It will be understood that the leading edge of each successive pulse in train PT110 is applied, within Y–S, to step the counterstages (as known in the art) so as to initiate a succession of eight, regular, successive Y-strobe signals, Y0000 through Y0007, along eight associated Y–S output lines (e.g. from each decoding stage). The occurrence of successive pulses PT110 acts both to terminate the prior strobe pulse and to initate a following one (here, once every 120 microseconds). Thus, the eight Y-strobe pulses indicated are generated successively, the train being responsive to PT110 to repeat this cycle indefinitely. PT110, thus, indirectly, controls issuance of initial strobe pulse Y0000 which, in turn, acts to initiate X-strobe X–S. However, those skilled in the art will understand that other clocking means may be used to generate such a series of strobe-pulses; such as a ring of cascaded multivibrators as known in the art.

A second train of clock pulses PT210 is generated by delaying pulses PT110 (conventionally) by a prescribed time to generate "sampling" (delayed start) pulses which occur at suitable sampling times with reference to "Y-strobe" signals (Y0000, etc.—preferably "looking" at them midway in their duration). Thus, sample pulses PT210 are applied to control Y-select unit Y–A and to control output gate $G_{oc}$ (*cf* FIG. 6).

In the embodiment shown, it will be recalled that, preferably, the X-detectors were distributed into two upper and lower groups X–AU, X–LU, being arranged to be processed alternately. Hence, one may understand that the arrangement described above (in FIGS. 3B, 3C and FIG. 4) accordingly indicates, in FIGS. 3B and 3C, that eight "x-photodetect" output-trains (from "upper" detectors *dx*–0 through *dx*–7) are applied along an upper output line (XUA00 pulse train to unit SC) and that eight like outputs (initiated at "lower" detectors *dx*–8 through *dx*–15) are applied along a lower, output line. From consideration of FIGS. 3B and 3C it will be seen that eight successive X-strobe pulses (X0000 through X0007—only first three shown in FIG. 5) will be applied from X-stobe X–S, serially, to gate the respective *x*-detector outputs in pairs (i.e. *dx*–0/*dx*–8, *dx*–1/*dx*–9 etc.), after the manner of Y-strobe Y–S. However, the duration of each X-strobe signal is about 960 microseconds (all eight Y-strobe pulses occurring within each single X-strobe pulse time). The X-strobe X–S is coupled to apply these eight successive strobe signals in parallel, to control unit SC (to 16 *x*-input gates thereof—namely gates G*x*–0 - G*x*–15) for decoding these XUA00/XLA00 pulse-trains, according to their time-sense, and initiating 16 corresponding *x*-input pulses, XM000–XM015, to be applied to respective X-input lines L*x*–0 through L*x*–15. Synchronizing signals SYN00 (FIG. 5) are generated with each occurrence of the first "*x*-strobe" signal X0000 and adapted to initiate, alternately, a pair of upper and lower enabling decoding pulses (SC720, SC730, respectively) applied to output coding stage OXD. Signals SC720, SC730 are applied to gate-out pulses from, respectively, the upper and lower *x*-output pulse-trains (XUA00, XLA00, respectively). Signal SYN00 is about 30 microseconds duration and will occur every 15.5 milliseconds, initiating SC720, which is about 7.75 milliseconds so that it, in turn, (e.g. through an inverter), may initiate SC730 when it terminates; SC730 also being 7.75 ms. long.

MEMORY INPUT

As aforeindicated (somewhat schematically), memory unit $S_TM$ comprises an "8 by 16" matrix array of (128) storage cells (circuits $C_{0\text{-}0}$ through $C_{15\text{-}7}$), one cell corresponding to each of the index points 103 on panel P. These cells are adapted to accept prescribed select signals "IX" for storage, for subsequent readout and, preferably for controlling a feedback—verification indication of the presence of each "hit" in a particular cell. Memory $S_TM$ will now be described in more detail, with reference generally to FIG. 3', and for particulars, to FIGS. 7–11. The matrix of storage cells $C_{0\text{-}0}$ through $C_{15\text{-}7}$ is arranged as aforeindicated so that eight such cells are presented in order along each row ("*x*-row") and along each column ("*y*-column") in the manner of their corresponding index points 103 on panel P. Thus, eight cells $C_{0\text{-}0}$ through $C_{0\text{-}7}$ are coupled in parallel, along a common input line L*x*–0 and a common output line L'*x*–0 (to provide common output signal train "XS000" thereon) and comprise cell-row *c*–*x*–0. Each of these eight cells has a unique "Y-strobe line" (L*y*–0 through L*y*–7) coupled operatively thereto, along a respective intersecting *y*-column of the matrix also comprising part of a corresponding cell column *c*–*y*–0 through *c*–*y*–7. Each Y-strobe (driving) line *ly*–1 etc. is connected to one cell in each *x*-row of its respective column; thus driving 16 "common-column" cells C together. As aforementioned, these Y-strobe driving pulses are controlled to be issued successively, along columns *c*–*y*–*c*–*y*–7, synchronous with the occurrence of successive strobe signals (Y0000 through Y0007, respectively) and cycling continuously to control cell read-in, cell readout, and cell feedback (i.e. feedback lamp excitation). Associated drive stages ($D_0$ through $D_7$ respectively) of drive unit DB provide these drive pulses responsive to signals Y0000 through Y0007, respectively. Each stage may preferably comprise a conventional (one-shot) multivibrator circuit arranged in a known manner.

A preferred embodiment of a memory cell circuit is shown in FIG. 7 (illustratively comprising cell $C_{O\text{-}O}$), although equivalent storage circuits may be used where appropriate, as apparent to those skilled in the art. However, there are distinct advantages to using an SCR (silicon controlled rectifier), and an indicator lamp L*p* in series therewith, as will appear hereinafter. The X-input and X-output lines, as well as the Y-strobe lines have been identified and discussed above. The operative elements of circuit $C_{OO}$ are an (incandescent) lamp L*p*–O/O, a solid state switch SCR–O/O and gating input and output diodes, D–O/O, D'–O/O, respectively (these being identified according to their associated index point O/O on panel P; as with the other 127 memory-cell circuits and associated elements thereof in the matrix). Each lamp L*p* will be understood as connected between a source of energizing potential (+15) and the anode of the SCR. The cathode of each SCR is coupled to a respective driver stage in DB, in parallel with the other 15 SCR's in the same column (e.g. SCR–O/O through SCR–15/0 to driver $D_O$ along strobe line L*y*–O). The input (decoupling diode D is coupled between the control lead of a respective SCR and the associated "X-input" line in parallel with the other seven cells of the respective row (e.g. D–O/O to cells $C_{OI}$ through $C_{O\text{-}7}$ along input line L*x*–O). An output line is also coupled in parallel to each of the seven cells in a given *x*-row (e.g. line L'*x*–O for cells $C_{OO}$ through $C_{O\text{-}7}$), being diode-coupled to the lamp-SCR junction of each (e.g. diode D'–O/O between L*p*–O/O and SCR–O/O and along L*x*'–O). As described below this allows readout in common (e.g. to provide output pulse train XS0000 from cells along L'*x*–O, FIGS. 6, 7 and 11).

FIG. 8 indicates, schematically and in representative fashion, the structure and operation of one of the Y-strobe driver units in Driver Unit DB, namely $D_O$ (see FIG. 3' also), adapted to accept a prescribed associated Y-strobe pulse YOOOO (along line 8–*i* from Y-strobe unit Y–S) to initiate its associated pulse generating means; namely (one-shot) multivibrator OSMV–O, adapted to apply a prescribed "interrogate/lamp driving" pulse (*cf* pulse wave form 10–CV in FIG. 10) to its associated output terminal YLDOOO, to be connected therefrom, in parallel, to the 16 associated SCR storage switches (namely to SCR–0/0 through SCR–15/0, coupled along column line Ly–O). Each time OSMV–O is initiated (by its associated strobe pulse) it will be apparent that (see FIG. 10) a waveform 10–CV will be developed. That is, a "switch-ON" potential will first be applied to drop the potential at the cathode of all 16 associated SCR's to approximately 0 volts (i.e. drop from 13.5 to OV during period $P_b$, of 140 milliseconds; the fall and rise times $P_a$ being about 20 milliseconds—thus effecting a "*y*-drive" pulse *yd*). Now, the concurrence of an *x*-input signal along the *x*-rows associated with any such SCR can act to "store a bit" (e.g. signal XMOOO along Lx–0 to SCR–0/0 as a "hit-bit" pulse, time-encoded to synchronize with Y0000 and thus indicating a 0/0 index point selection—assuming stage $D_0$ is involved still). Thus, for instance, SCR–0/0 can be "switched-ON" to register a "hit" (selection or "pick") at corresponding point 0/0 on panel P. It will be understood that coincidence of such a "*y*-drive" pulse "*yd*" and an associated "hit" pulse will operate, as known in the art, to energize the respective SCR. For instance, a hit pulse on diode D–0/0 will switch SCR–0/0 to conduct a "-store-pulse" ("*gp*") from source +15, this passing through associated indicator lamp Lp–0/0 and being sufficient to "overdrive" it (e.g. at about 300 ma. current level vs. normal rating of about 100 ma.). Of course, this "coincident-select" event must occur during the cyclic period $P_b$ of "*y*-drive" pulse *yd* associated with the SCR, so that the lamp will be so driven only during $P_b$ time (cyclic over-driving). At the conclusion of this "*y*-drive" period $P_b$, and during the balance of the multivibrator cycle (i.e. the rest of the complete period $P_c$, about 960 ms.), the potential on terminal YLD000 will be raised to about 13.5 volts, a prescribed "hold" potential (during "hold period"). This "hold" potential is arranged to be sufficiently positive to prevent erroneous switching of the SCR; (e.g. from a hit signal on Lx–0 not occurring at the strobe time for Ly–0); yet not so positive as to wholly deenergize the SCR-lamp combination; that is acting as "a hold," or "keep alive," potential so that the "selected" SCR is kept "ON," and somewhat conducting, once switched). Thus, once a particular SCR is switched "ON," each successive cyclic reoccurrence of its associated "*y*-strobe" pulse will necessarily excite the associated indicator lamp to go "ON" briefly; these excitations (flashes) continuing at high-frequency strobe-intervals and being arranged to be fast enough to make the lamp appear constantly "ON" (to the human eye), though brief enough not to overheat or burn out the lamp.

To recapitulate the selection mode, consider FIG. 9 where the "*c–x–0* row" of Memory Matrix $S_TM$ is, schematically and representationally shown, being understood as comprising eight storage cell circuits $C_{0\text{-}0}$ through $C_{0\text{-}7}$ (intermediate cells omitted in FIG. 9). Now, for instance, if selection was made of index point 0/7 on panel P (corresponding to coincident interruption of the light beams to detectors *dx*–0 and *dy*–7), then the *x*-row input pulse train "XM000" along input line Lx–0 and will contain a corresponding "hit" pulse therein which will coincide with the occurrence of the Ly–7 strobe pulse ("*yd*" on indicated strobe wave), these coacting to switch associated SCR–0/7 and lamp Lp–0/7 "ON." Signals XM000 are understood as applied along line Lx–0 from the indicated transistor amplifier (*cf* base input 9–*i*) or any conventional equivalent. The multivibrator generating strobe waveform 10–CV will be understood as controllable (conventionally; e.g. by operator control) to periodically raise waveform 10–CV to a "clear-voltage" level (+15V, indicated at "clear time" along 10–CV), when a "Memory-clear" function is to be effected. That is, until this "Memory-clear" signal occurs, strobe pulses will continue to hold SCR–0/7 "ON" (at 13.5 v.), periodically passing a burst of "indicator current" (to flash Lp–0/7) i.e. when pulse "*yd*" occurs. Now, it will be seen that the operator will accordingly observe this "flashing" of a lamp Lp as a "highlight" (or feedback signal) "*fb*" at the selected point on panel P (e.g. at point 0/7 for lamp Lp–0/7). The optical presentation of such highlights "*fb*" from a particular lamp Lp to the associated index point on panel P can be readily implemented by conventional projection means, known in the art. Preferably, lamps Lp are arranged in an "8 by 16" matrix in feedback projector FBP (FIG. 2) and disposed within a projection system that registers and focuses their spot-illumination at respective index points on panel P.

In the foregoing description of the overall organization of memory $S_TM$ (see FIGS. 3, 3') the readout mode was generally indicated as controlled in part by Y-strobe Y–S and in part by X-strobe X–S. According to another general feature of the invention, the readout mode will be seen as enabled along a particular *y*-column by occurrence of the aforementioned associated "y-drive" pulse *yd*, as well as being "serialized" thereby along a respective *x*-row output line (1'*x*). Thus, each of the 16 trains of output signals "OX" (i.e. XS000–XS015) are pre-encoded to have a *y*-strobe time-sense, indicating which of the eight *y*-columns they are associated with. According to another, related, feature of the invention, this group of 16 outputs may be further encoded to be serially presented along a pair of lines to output stage OC, along with the 16 *x*-strobe signals (X0000–X0015) from unit X–S. That is, the outputs from OXD may be serialized to comprise a single train of output signals "SS," ultimately presented to the output control stage OC. Signals "SS" are presented in serial, time-encoded fashion to have both an X-time-sense and a Y-time-sense (much in the manner of a video signal applied to a CRT display; there being 16 successive "*x*-rows" periods, each subdivided into eight successive *y*-column times).

The general sense of this mode of memory readout is indicated in the "schematic overview" in FIG. 6 where the memory $S_TM$ is generally indicated as presenting the 16 (Y-encoded) "*x*-rows" outputs (XS000, etc.) to output gating stage OXD where, under the control of X-strobe X–S, these outputs being serialized and encoded for serial application to output control stage OC. Preferably, however, this gating is accomplished in two groups (upper/lower *x*-rows); the groups being serialized thereafter and readout to OC from upper and lower gate-out gating $G_U$, $G_L$ under prescribed time-control (pulses SC720, SC730). Thus, considering memory $S_TM$ in the schematic representational showing in FIG. 3', as being under the periodic readout control of the Y-strobe pulses (Y0000 to Y0007, from $D_0$ through $D_7$, respectively), it will be seen (in connection with FIG. 11 below) that each of output line L'*x* emits a train of eight ("hit," "no-hit") readout pulses (one from each storage cell therealong), doing so continually, in cyclic synchronism with strobe Y–S, the 16 output signal trains comprising signals "OX." It will be understood that each of these 16 "OX" outputs is applied to an associated code-out gate ($G'_0$ through $G'_{15}$) in out-coding unit OXD. Each code-out gate is coupled to a respective one of the eight output lines from strobe X–S so the gate is "enabled" by concurrent inputs thereto as known in the art. In this manner, out-coding unit OXD will serialize these "OX" pulse trains into a composite overall serial train of output signals SS, applied to control stage OC. Thus, it will be seen that a serialized output XUS00 will be applied from the "upper" set of eight code-out gates ($G'_0$ to $G'_7$) to upper readout gate $G_U$; while the serialized output XSL00 from the "lower" set ($G'_8$ through $G'_{15}$) will be applied to lower readout gate $G_L$. The outputs from $G_U$, $G_L$ will be "time-staggered" after the other by signals SC720, SC730 (FIG. 5).

Thus, output signals "SS" will comprise a train of 128 selection-indicating signals (one for each index point in panel P), this train being cyclically presented to output control stage OC, at control gate $G_{OC}$ thereof (FIG. 6). Transfer out of gate $G_{OC}$ will be seen to be synchronized with the occurrence of sampling pulses PT210 (to conventionally correct signal timing, compensate for signal-shift errors, etc.—see FIG. 5 also) and with a "transfer-enabling" signal "*tr*" from control unit OC. Unit OC will be understood as providing a number of transfer-control functions understood in the art. For instance, it may control data transfer in response to "transfer-data" commands (e.g. start signal "STC00" and reset signal "RTC00" generated at operator panel CB); or to a "mode-select" signal "CHMOH"; or to a "clear memory" signal CLR00 or to "synch signal" SYN00. It may also generate pulses to precede data ("BAS-10") or to follow data ("FAD-10" ). When operating in the "character-mode" (i.e. one point at a time, as from a keyboard), the "frame enable" signals and "-clear-memory" signal CLR00 issues continually in alternate "-frames" (i.e. signal transmission in one frame; erase in the next).

A better understanding of the readout operation from memory $S_TM$ may be had by consideration of FIG. 11 indicating, very schematically and representationally, two of the eight "XS000" memory cell circuits, i.e. from storage cells C-0/0 and C-0/7 (see also FIG. 3' and the particulars of FIGS. 7 through 10). For purposes of explaining a typical digital readout of a "selected" SCR, it will be assumed that read-in has occurred for all 128 memory cells in Memory Matrix $S_TM$ and that, of the eight cells of the indicated "XS000" row, only cell C-0/7 has recorded a "hit" (indicating selection of index point $X_0$, $Y_7$). As a feature, it will be seen that readout may be enabled automatically and continually, (even interspersed during read-in). In particular, during read-in (e.g. along input line Lx-0) within a particular Y-strobe cycle, it will be assumed that, of the eight successive Y-strobe signals (enabling associated SCR's along the eight associated lines Ly-0 through Ly-7), only at SCR-0/7 did the strobe signal coincide with a "hit" signal (which, of course, is applied to the control electrode of SCR-0/7 to "enable" it), thereby switching SCR-0/7 (alone, along Lx-0) to a "hit," ("selected" or, conducting state). Thus, until memory is later cleared, each time the associated driver pulse (*cf* waveform 11-CV, analogous to 10-CV in FIG. 10, described above), switches "ON" (i.e. drops, at "drive pulse" *yd'*, to its low voltage state), the associated indicator lamp Lp-0/7 will pass a surge of indicating-current and light-up (flash on), causing a feedback spot "*fb*" to be projected on panel P at the corresponding index point (*x*0, *x*7—*cf* FIGS. 1A and 2), to verify the recorded selection to the operator. Now, as aforementioned, the output line L'*x*-0, along which the "XS000" readout signal train will be carried from all eight associated cells, is diode-coupled, in parallel, between each lamp-SCR combination via a respective coupling diode (D'-0/0 through D'-0/7). Thus, it sill be understood during each strobe cycle when these "lamp-on" pulses *yd'* sequence this *x*-row to each succeeding cell circuit, the voltage applied to each associated output-diode D' will either drop drastically (from 13.5-0V.) in the case of a "selected" SCR; or not drop at all (not significantly). Thus, in the embodiment shown, the voltage to D'-0/7 should drop from about 15 to 13.5 volts by virtue of switching SCR-0/7, except during the application of "drive pulse" *yd'*, when it will drop much more, from 13.5 volts to approximately 0 volts. This 13.5 volt drop will be sufficient to switch diode D'-0/7 "ON" (during *yd'*) to present a "switched" pulse "*sp*" to an associated output inverting transistor I-11 (the base thereof) to render it nonconducting the while. Pulse "*sp*" is adapted to switch-off inverter I-11 for period "*yd'*," being applied thereto through an associated potential divider circuit 11-R and operating conventionally. Thus, during any of the eight successive column-interrogation (lamp-driving) pulses of a given Y-strobing scan cycle (from driver stage DB, see FIG. 3), a train of eight successive bit-indicating pulses ("hits" or "no-hits") will appear at the output of inverter I-11 and comprise the Y-encoded train of pulses "XS000" along this *x*-row. A similar train of pulses will appear in parallel at the other 15 *x*-row outputs presented to output gate stage OXD.

In summary, it will be apparent that the foregoing embodiments teach improved novel data terminal apparatus for data processing arrangements and especially for terminals adapted to display and probe-enter data selections and their associated features. One such feature will be the arrangement of a display panel-selection device for automatically generating "select signals" (and feedback verification) simply by manipulation of a probe element. A related feature is that such a signal selection may automatically be "read-in" into a storage cell array under the control of a prescribed strobing arrangement which is also adapted to control the resetting of stored data and the readout thereof. A further feature is the provision of indicator means at each individual storage cell of this array together with a bistable storage switch adapted to enable the indicator means; both the switch and the indicator being adapted to be excited by an appropriate signal from the strobe means. A more particular feature teaches the use of indicator lamps arranged in a prescribed matrix corresponding to respective selection points on the display panel, together with a projection system, such that excitation of a prescribed lamp in the array will result in a "verification" feedback "spot" on the panel. A more particular feature is to provide this strobing according to a set of periodic strobe pulses, one for each column of such cells, these pulses being "bilevel" and being controllable to vary between an excitation level and a "hold" level, periodically, to accordingly "flash" an indicator lamp and, alternately, keep it "alive."

While in accordance with the provisions of the statutes there have been illustrated and described the best forms of the invention known, it will be apparent to those skilled in the art that changes may be made in the apparatus described without departing from the spirit of the invention as set forth in the appended claims and that in some cases certain features of the invention may be used to advantage or substituted for without a corresponding change or substitution in other features.

Having now described the invention, what is claimed as novel and for which it is desired to secure by Letters Patent is:

1. A data entry/display system comprising:
   a. a screen having a plurality of index loci,
   b. probe means,
   c. means responsive to the proximate location of said probe means with respect to said index loci for generating a select signal,
   d. a plurality of storage cells comprising bistable switch means, each cell corresponding to one of said index loci,
   e. means responsive to said select signal for changing the state of said bistable switch means of a corresponding storage cell to thereby provide storage of said select signal, and
   f. indicator means responsive to said switch means for visually indicating storage of said select signal on said screen.

2. A system as set forth in claim 1 wherein said index loci are arranged in a prescribed number of rows and columns.

3. A system as set forth in claim 1 wherein said bistable switch means are silicon controlled rectifiers.

4. A system as set forth in claim 1 wherein said screen has at least two transverse edges each containing a plurality of radiation sources, and said index loci are defined by the intersections of beams of radiation produced by one source from each of said transverse edges.

5. A system as set forth in claim 4 wherein said screen has at least two additional edges parallel to said transverse edges, each containing a plurality of sensors, each sensor being responsive to a radiation beam from one of said radiation sources.

6. A system as set forth in claim 5 further comprising means responsive to said sensors for generating said select signal.